June 8, 1965

C. G. DODD 3,187,564

METHOD FOR MEASURING PROPERTIES OF FILMS
EXISTING BETWEEN BULK LIQUIDS

Filed Nov. 30, 1959

LEGEND

⊙ = RATE OF ROTATION INCREASING

▫ = RATE OF ROTATION DECREASING

INVENTOR.
CHARLES G. DODD

BY

ATTORNEY

LEGEND
⊙ = RATE OF ROTATION INCREASING
▫ = RATE OF ROTATION DECREASING

INVENTOR.
CHARLES G. DODD

INVENTOR.
CHARLES G. DODD

3,187,564
METHOD FOR MEASURING PROPERTIES OF FILMS EXISTING BETWEEN BULK LIQUIDS

Charles G. Dodd, Norman, Okla., assignor to The Pure Oil Company, Chicago, Ill., a corporation of Ohio
Filed Nov. 30, 1959, Ser. No. 856,092
9 Claims. (Cl. 73—59)

This invention relates in general to the measurement of mechanical properties of liquids, and more particularly to the measurement of such properties at the interface between two immiscible liquids of differing densities. In more specific aspects, this invention relates to the measurement of physical properties of a film existing at the interface between two immiscible liquids, and the utilization of the information thereby gained for identifying the source of a crude petroleum, or for developing a process for the secondary recovery of petroleum.

It is known that two immiscible liquids will sometimes form a film at the surface between the liquids, and that the rheological properties of this film may be very different from the properties of either liquid. The rheological properties of films at the surfaces between liquids and gases have been investigated by numerous workers using a variety of instruments, but no satisfactory method has been found to determine the general rheological properties of films at liquid-liquid interfaces, and especially those occurring between crude oil and water. Some immiscible Newtonian liquids are known to produce non-Newtonian films at the liquid-liquid interface. It has now been found that it is possible to measure quantitatively the non-Newtonian character of such films.

It is a primary object of this invention to provide a method by which the properties of liquid-liquid interfacial films can be studied and measured. It is a more specific object of this invention to provide a method for determining the optimum quantity of heat, caustic, or surfactant which must be used to modify a non-Newtonian film at a liquid-liquid interface to produce an essentially Newtonian film. Another object of this invention is to provide a method for determining the optimum amount of heat, surfactant, or caustic to be added to the floodwater in the secondary recovery of petroleum to achieve the highest economy of production. Still another object of this invention is to provide a method for determining the effectiveness of chemical agents in modifying the properties of a film existing between two immiscible liquids. It is yet another object of this invention to provide a method for determining the geological source of a petroleum oil by measuring the characteristics of a film at the interface between said oil and a second liquid, and comparing data thus obtained with data obtained by measuring the characteristics of a film at the interface between a petroleum oil known to have originated from the source in question and the same second liquid.

Figure 4:
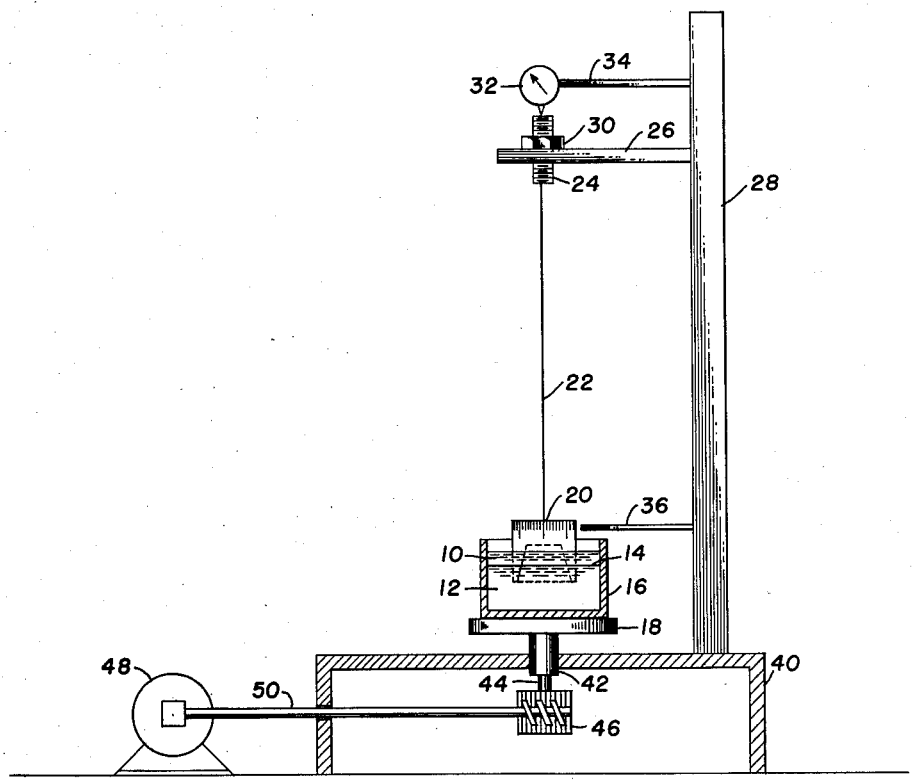
FIGURE 4 is a side elevational view of an apparatus which may be used with the method of this invention.

Various rotational viscometers are known to the art and are available commercially. Such viscometers may be converted to an interfacial viscometer suitable for use in the method of this invention. Such a converted instrument is shown in FIGURE 4. Liquid samples 10 and 12 are immiscible and of differing densities, and interfacial film 14 lies at the boundary between these liquid samples, which are contained in vessel 16, which rests on turntable 18 coaxially therewith. Partially submerged in liquids 10 and 12, and extending through film 14, is cylindrical bob 20, which is suspended on torsion wire 22 from chuck 22. Chuck 24 is supported by arm 26 of frame 28, and is provided with threads mating with nut 30 to provide means for raising and lowering bob 20. The upper end of chuck 24 bears against depth gauge 32, which is supported on arm 34 of frame 28. The vertical position of bob 20 can thus be accurately determined. The upper portion of the outer cylindrical surface of bob 20 is graduated circumferentially in degrees, and registers with an index mark on stationary pointer 36. It is essential that turntable 18 and wire 22 be coaxial.

Turntable 18 is rotatably supported by base 40, suitable bearing means 42 being provided to maintain accurately the position and alignment of the turntable. Shaft 44 extends downward from the turntable and terminates at gear 46. Suitable means, including motor 48 and driveshaft 50 are provided to drive the turntable. Thus, the instrument consists essentially of a rotating vessel and a hollow, inverted, cylindrical-type bob suspended on a torsion wire. The interior tapered edge of the bob dips through the surface of the liquid sample held in the rotating vessel, which is supported by the turntable. As the vessel is rotated at a constant rate, the torque appplied to the bob produces an angular deflection against the resiliency of the torsion wire. This torque and deflection are proportional to the shearing stress between the liquid and the bob.

The following factors have been found to be essential to the modification of a commercially available rotational viscometer for the study of liquid-liquid interfacial films. The rotational speed of the turntable must be adjustable continuously and smoothly over a range from about 0.1 r.p.m. to about 50 r.p.m., and the rate of rotation must remain constant once it is set at any speed within this range. This requires that the motor and gear train, or other driving mechanism, must operate without vibration and substantially without backlash. The axes of rotation of the sample vessel and of the bob suspended therein must be coaxial. Provision must be made for lowering the bob to a predetermined and reproducible depth of submersion through the upper oil phase, interfacial film, and lower aqueous phase. The lower edge of the cylindrical viscometer bob must tapered sharply to minimize end effects in the lower phase. The bob must be constructed of a material which will be wet by the two bulk liquids under test. For the study of petroleum-water systems, clean brass is suitable, for example, and may be unfinished or coated with a baked lacquer. Plastics having extremely low surface energies, such as Teflon and other fluorohydrocarbon plastics, are not satisfactory. The contact angle with which the upper phase wets the bob should, preferably, be less than 90 degrees. The moment of inertia of the bob and the torsion wire constant should be selected to provide sufficient sensitivity and dampening. A 34-gauge wire has been found to work satisfactorily for oil-water systems. Since temperature control is essential for reproducibility of results and for observations of the effects of transient temperatures, some means for controlling temperature must be provided. A satisfactory type of temperature control is described by Brown, Thuman, and McBain, Journal of the College of Science, 8, 491 (1953). This control system comprises a water-filled jacket which encloses the apparatus.

In making liquid-liquid film measurements with the described apparatus, vessel 16, which may be a petri dish, is filled uniformly with 50 milliliters of the more dense phase followed by a covering of 10 milliliters of the less dense phase. The vessel is then placed in the rotatable turntable of the viscometer, and a clean viscometer bob is lowered to a predetermined depth of submersion through the upper phase and the interfacial film and into the lower, more dense phase, to a depth of about 5 millimeters therein. After the viscometer bob has come to rest, the angular rest position may be recorded, and if all of the materials have previously been brought to the desired test temperature, the rotation of the turntable is started at a slow rate, preferably a little less than 1 r.p.m. A reading of the angular deflection of the bob may be taken as soon as the bob resumes a steady position. The rate of rotation of the turntable may then be increased and a second deflection read when steady state conditions again exist. A typical run will consist of about 8 points measured at successively increasing rates of rotation starting at a little less than 1 and going up to 25 or 30 r.p.m., preferably in uniform increments, followed by about 8 measurements at selectively decreasing rates of rotation ending at approximately 1 r.p.m. This procedure permits the obtaining of reproducible data readily interpretable with respect to the characterization of the rheological properties of the interfacial film. While absolute values of Newtonian, apparent, or plastic viscosities, Bingham yield values, or bulk interfacial phase elastic moduli cannot be determined directly by this procedure, such values can be obtained by the method of running corresponding tests on a similar bulk liquid having no interfacial film, and subtracting the results obtained from those of the first test. It is convenient, for example, to compare the curves obtained as described with those obtained when 60 ml. of a Newtonian liquid or 50 ml. of water and 10 ml. of another non-film-forming Newtonian liquid are in the vessel. A subtraction of the viscometer bob deflection due to Newtonian liquids having the same bulk viscosities from the data obtained with film-forming, immiscible liquid pairs permits approximate film flow curves to be plotted, but such different curves are not shown in the figures accompanying this application.

The procedure of continuously increasing rates of rotation was found necessary because it is difficult to reproduce the rest-point deflection when the instrument is stopped after each reading. Significant differences were found in the rheological behavior of liquid-liquid interfacial films studied with respect to the types of liquids used. Important rheological characteristics of these liquids appear to be the thixotropic properties as indicated by the degree of hysteresis, that is non-reproducibility, of the data at increasing and decreasing rates of rotation, which correspond to increasing and decreasing rates of shear. If other factors are held constant, the degree of thixotropy in the system is indicated by the area of the hysteresis loop.

Figure 1:
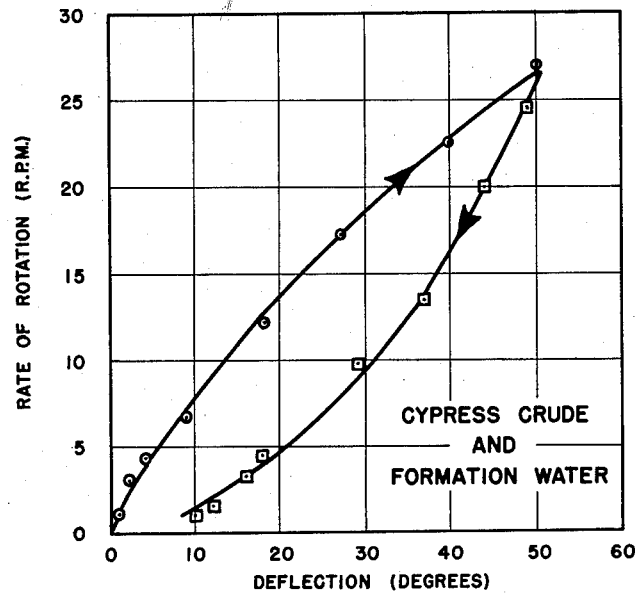
FIGURES 1 to 3 are graphs showing the results obtained in the study of interfacial films in various liquid systems using the method of this invention.
Figure 1:
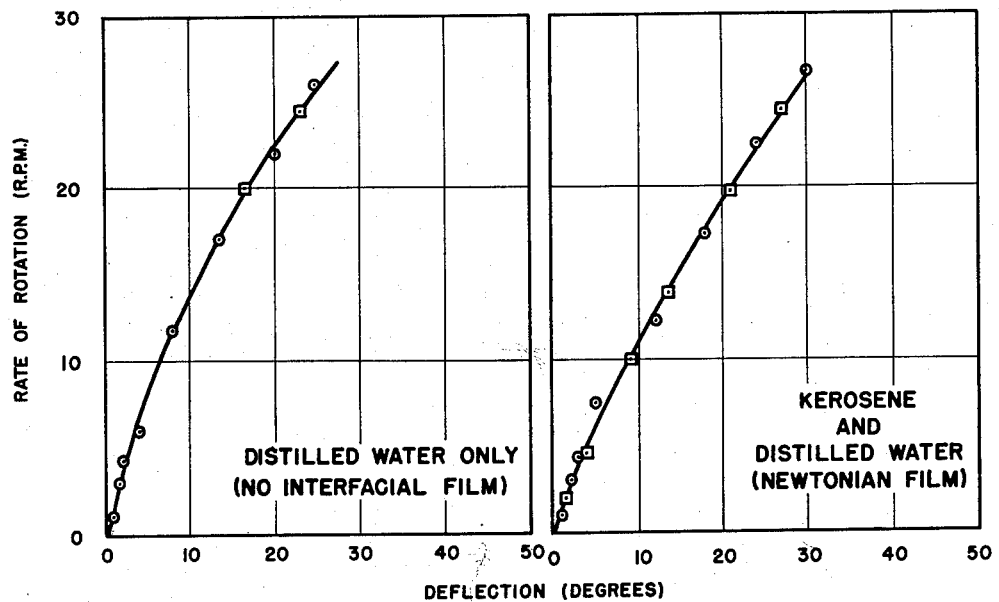
Figure 2:
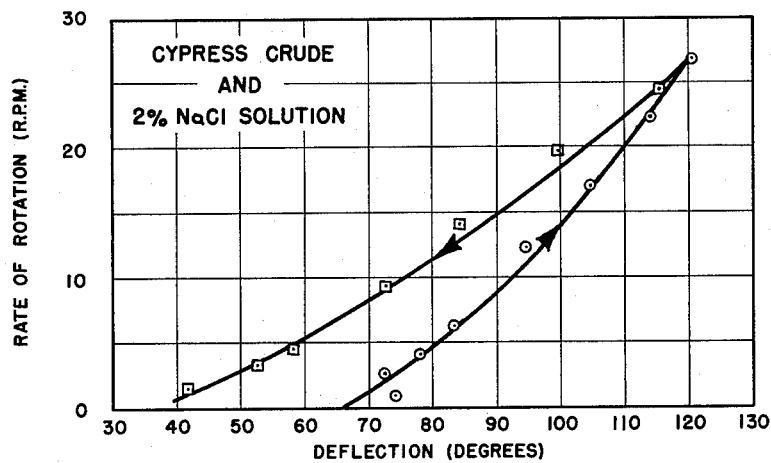
Figure 2:
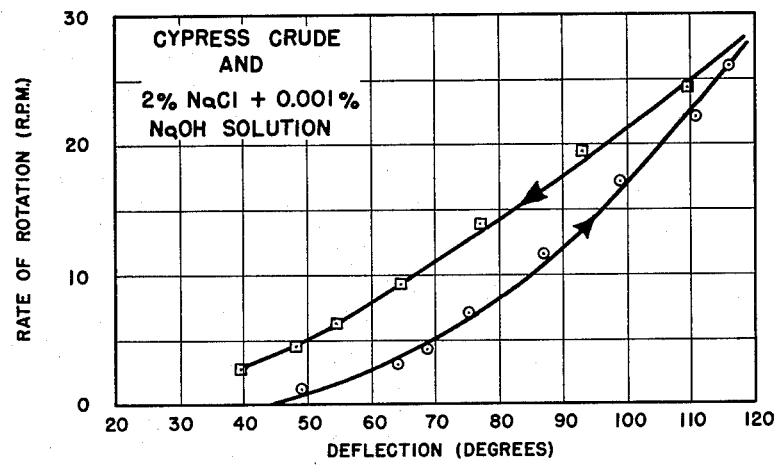
Figure 2:
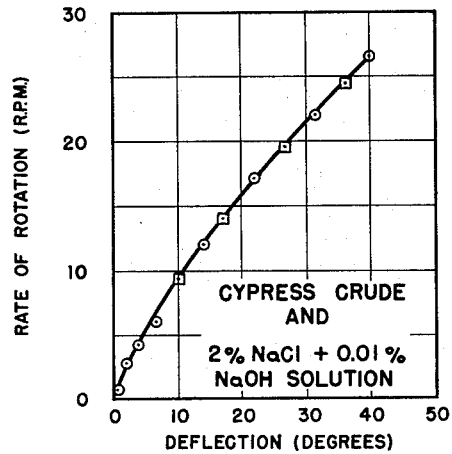
Figure 3:
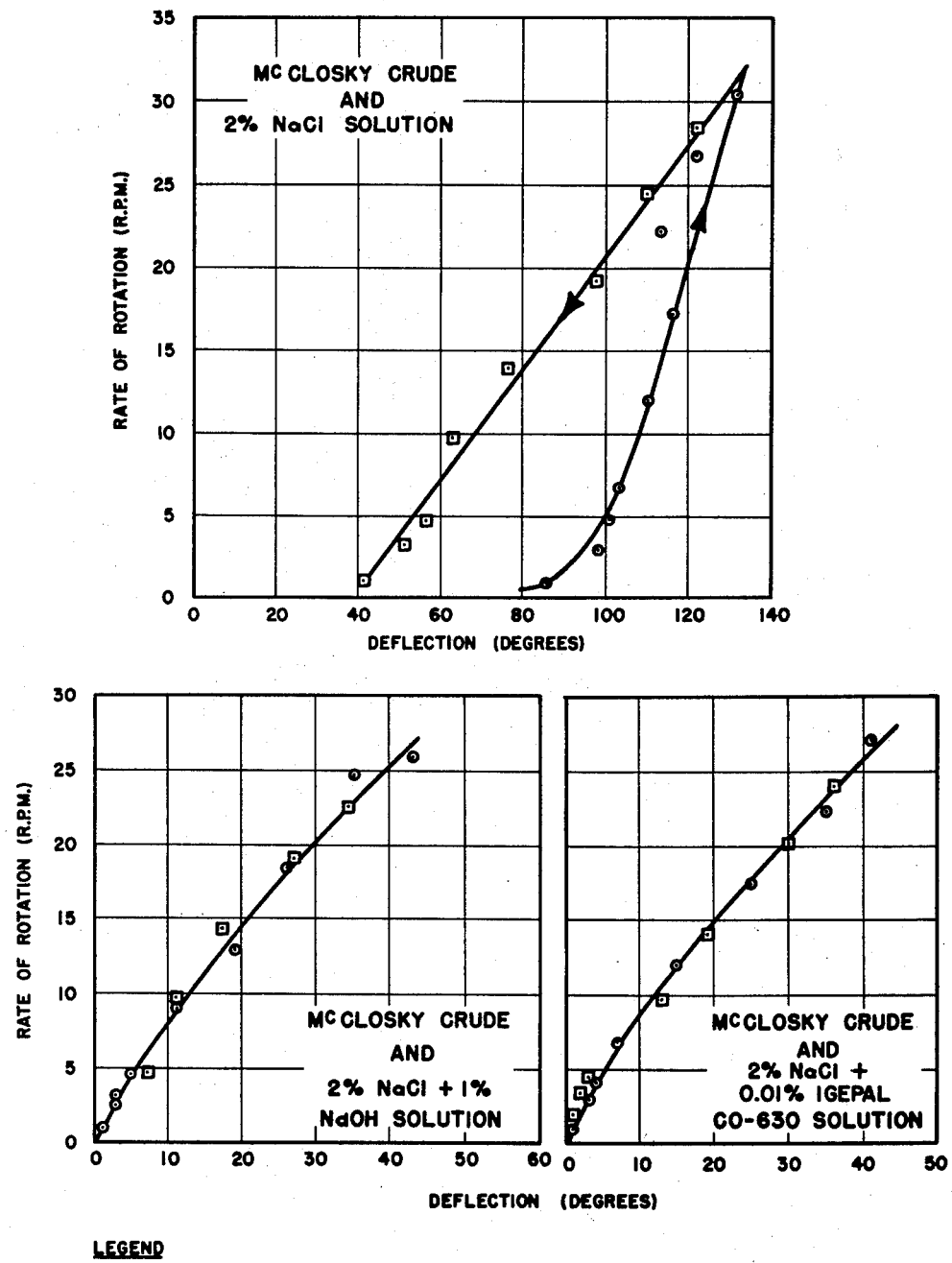

All of the curves in FIGURES 1 to 3 were produced using essentially Newtonian liquids. Some of the films existing at the liquid-liquid interfaces were essentially Newtonian. Others were non-Newtonian. Whenever curves representing Newtonian behavior were obtained, it was assumed that the rigidity of any film formed at the liquid-liquid interface was negligible and the rheological properties of the liquid-liquid system were essentially those of the bulk liquid phases. A distilled water calibration curve shown in FIGURE 1 was obtained using a volume of water equal to the combined volumes of the water and crude oil used in the remainder of the tests the results of which are shown in FIGURES 1 to 3. This calibration curve gives an indication of the type of curve to be expected for a Newtonian liquid of approximately 1 cp. viscosity. When 50 ml. of water were covered by 10 ml. of kerosene, essentially the same curve was obtained, and this curve is also set out in FIGURE 1. Similar curves, representing Newtonian behavior and essentially no film strength, were measured on films of some crude-oil water systems which were studied.

While it is true that the rheological diagram for a Newtonian liquid (bulk liquid phase) should be represented by a straight line intersecting the origin of the diagram, the distilled water calibration curve of FIGURE 1 has a slight curvature convex to the rate of shear or rotation axis. This curvature is believed to be caused by an artifact resulting in part from the measurement procedure used, but largely to imperfect centering of the viscometer bob in the sample dish. Suspended on the torsion wire, the bob was free to oscillate about its axis; furthermore, the vessels used were not precisely circular. At higher rates of rotation the bob was more nearly centered. All of the rheological curves obtained with crude oil-water systems might have been corrected to a degree sufficient to straighten out the calibration curves measured with Newtonian liquids. The corrections were not made because the object was not to determine absolute rheological properties using the method of this invention. The important information which can be obtained using the method of this invention is the relative shapes of the curves and particularly the area under the hysteresis loop produced by a non-Newtonian film existing between two Newtonian liquids. As long as the instrument constants are the same for the different runs, the rheological diagrams produced from the data obtained in these runs can be compared. If the thickness of the interfacial films were known, it would be possible to calculate the elastic constants of these essentially bulk phases, using the calibration curves to obtain instrumental constants. The important point is that clear differentiation is obtained between the rheological behavior of a Newtonian liquid system and essentially the same system with a more or less rigid interfacial film at the oil-water interface. The fact that significant differences can be recognized on the curves indicates that these oil-water systems have interfacial films of unusually high rigidities.

The points plotted for kerosene and distilled water systems in FIGURE 1 show that the film between the kerosene and distilled water is essentially Newtonian, that is, the data obtained at increasing rates of shear (rotation) are repeatable at decreasing rates of shear. Thus, a single trace is produced from the origin to the point of maximum shear and back again to the origin. The Cypress crude and formation water system of FIGURE 1 shows a hysteresis loop characteristic of a rigid, non-Newtonian film at the interface between the crude oil and formation water.

The effective viscosity of a non-Newtonian liquid for dispersion at give rate of shear is proportional to the slope of the line drawn from the origin of the rheological diagram to the point on the curve measured at the desired rate of shear. The effective viscosity of such a system is shown to be a transient quality dependent, among other factors, on the past history of the particular sample. The rheological diagrams obtained from tests conducted according to the method of this invention upon two illinois basin crude oils, Cyprss crude and McClosky crude, are set out in FIGURES 2 and 3, respectively. Examination of the curves discloses a wide variety of rheological behavior encountered in the various interfacial films. Some of the systems demonstrate relatively simple Newtonian behavior, for example, those in which relatively large amounts of caustic or surfactant were added to the aqueous phase. But many of the interfacial films show definite non-Newtonian properties.

The power of sodium hydroxide solutions to eliminate or minimize the non-Newtonian properties of the films is demonstrated by FIGURES 2 and 3. A Cypress crude and 2% NaCl solution produced a characteristic hysteresis loop. The addition of 0.01% sodium hydroxide to the salt solution modified the curve drastically, and the resulting single trace indicates a substantially Newtonian film at the aqueous-crude interface. A 0.001% sodium hydroxide, 2% NaCl solution is shown to only slightly modify the curve from that produced by the Cypress crude and 2% NaCl solution. Thus, the effect of pH on the interfacial film is demonstrated. Referring to FIGURE 3, it can be seen that the McClosky crude-salt solution interface comprises a highly rigid non-Newtonian film. Adjustment of the pH of the aqueous phase, or the addition of surfactant to the aqueous phase, results in a modification of the film to essentially Newtonian characteristics.

It has been found that the films existing at the interface between two Newtonian liquids are highly time-sensitive. Thus, the thixotropic curve obtained using the method of this invention with a liquid-liquid system will sometimes vary drastically, depending upon the time interval between when the system is prepared and when it is tested. It is essential therefore that the results obtained on zero-age systems be correlated only with those obtained upon other zero-age systems. Where desired, the prepared liquid systems may be stored for any desired uniform length of time before testing. Different, but correlatable results will thus be obtained.

The data obtainable by the method of this invention is applicable to a wide variety of uses. As a specific example of the application of the method of this invention to the petroleum industry, the apparatus described in the specification and depicted in FIGURE 4 is used to determine the rate of shear v. shear stress curve characteristic of the film existing between a Cypress crude oil and water obtained from the same formation. The sample vessel is filled with 50 ml. of formation water followed by a covering of 10 ml. of the Cypress crude oil. The vessel is then placed on the turntable of the viscometer, and the bob is lowered to a depth of submersion through the oil and interfacial film and into the formation water to a depth of 5 mm. After the bob has come to rest, the angular position thereof is noted and recorded. Rotation of the turntable is begun at a slow rate, and a reading of the angular deflection of the bob is taken as soon as it assumes a steady-state condition. The rate of rotation of the turntable is then increased and the corresponding deflection read to determine the next point. This procedure is continued until 8 points at increasing rotational speeds are obtained. Immediately thereafter, 8 points are obtained at decreasing rates of rotation. A curve corresponding to Cypress crude and formation water curve depicted in FIGURE 1 is obtained. Since it is known that the successful recovery of petroleum by water-flooding operations is dependent upon the absence of non-Newtonian rigid films at the oil-water interface, it is concluded that a successful secondary recovery process cannot be obtained by merely injecting floodwater. Similar tests are conducted using Cypress crude oil obtained from the formation in question and a 2% NaCl solution. The tests are continued using Cypress crude oil and a 2% NaCl solution containing 0.01% and 0.001% sodium hydroxide. Curves corresponding to those depicted in FIGURE 2 are obtained. From the examination of these curves, it is concluded that successful oil recoveries could not be obtained by the injection of dilute brine. It is noted, however, that if the pH of the injected brine is adjusted to produce a higher pH at the crude oil-water interface, a successful secondary recovery operation can be obtained. It is further noted that the amount of caustic at the oil-water interface must be greater than 0.001% sodium hydroxide equivalent, but that amounts of caustic greater than 0.01% sodium hydroxide equivalent would be wastefully large.

With some crude oil-water systems, it will be found that the oil-water interfacial film is essentially Newtonian in behavior. Under such circumstances, the modification of the film by the use of heat, caustic, or surfactant is inadvisable in that no imrovement in oil recovery can be expected. Hence, the injection of a suitably-treated floodwater without further modification is indicated. Using the method of this invention, as has just been set out, it can be seen that where it is found that a rigid, non-Newtonian film exists at the crude oil-water interface, the amount of surface-modifying agent, be it caustic, surfactant, or heat, all of which are known to the art, required to render the film substantially Newtonian can be determined. Moreover, it is possible to find the exact extent to which the aqueous phase must be modified to produce maximum oil recovery without the use of wastefully large quantities of the surface-modifying agent.

Another application of the method of this invention to the petroleum industry resides in a method for determining the geological source of a petroleum oil. It is often desired to determine whether the oil produced from two or more wells originates in the same reservoir or in different reservoirs. The rheological behavior of a film at the interface between a crude petroleum from a given reservoir and the associated connate water serves as a "fingerprint" to identify the particular oil-water system. thus, samples of water and oil may be recovered from a particular well, and applying the method of this invention, a curve characteristic of the non-Newtonian film existing at the interface between the oil and water may be obtained. In an exploration program in a new area, this makes it possible to compare the samples of oil and water produced from new wells to determine if the oils are from the same reservoir, or, what may be more important, to determine if two adjacent reservoirs originally were part of the same reservoir and came from the same source rock. This method is predicated upon the supposition that no two oil-water systems having different geological origins will produce indentical rate of shear v. shear stress curves. Tests conducted on various crude oils, as exemplified by the Cypress crude and McClosky crude of FIGURES 2 and 3, indicate that it would be an extreme coincidence if identical curves were in fact produced.

A related application of the method of this invention relates to the problem of identifying crude oils produced from a single well completed in more than one formation. Often it is desirable to know whether the oil being produced is from one formation or the other, or indeed, if it is a mixture of the two oils. Such determinations can be made by use of rheological flow diagrams as unique identifications of each oil. The mixture of oils would produce a composite curve. In both of the foregoing applications there may be no water produced with the oil if the reservoir is in its early production life. In this case, it may be possible to use any standardized aqueous phase as the means for identifying the oil by its rheological diagram. In particular, it is desirable to use several different types of aqueous phases in order to establish more than one characteristic rheological diagram for each oil. Thus, the characteristic curve may be obtained by testing the oil with distilled water, by testing the oil with salt water, and by testing the oil with a dilute caustic or surfactant aqueous solution.

As a specific example of an application of the method of this invention to the petroleum industry, it is desired to determine whether the oil produced from two widely spaced wells originated from a common reservoir. Both wells produce petroleum oil and connate water. Samples of oil from each well are obtained and the characteristic curve of the interfacial film between the oil from each well and a 2% NaCl solution is obtained. The oil from the first well produces a curve corresponding to the Cypress crude/NaCl solution curve of FIGURE 2. The second oil produces a curve corresponding to the McClosky crude/NaCl solution curve of FIGURE 3. Comparison of the curves shows a difference in area under the hysteresis loop and a difference in the slope of the curves at given shear rates, and thus the conclusion is reached that the petroleums must originate from different geological reservoirs.

The method of this invention will further have utility in the experimental determination of the effectiveness of various surfactants for destroying rigid films existing between immiscible liquids. The extent to which dilute surfactant concentrations will modify the thixotropic properties of the interfacial film of any given liquid-liquid system is indicative of the effectiveness of the surfactant with that particular system. Other applications of the method of this invention will be found in the determination of the thixotropic properties of the film existing between two liquid, molten metals, one of which might be molten bismuth, for example, used in the metallurgical purification of spent uranium fuel elements. Appropriately-modified, interfacial-film viscometers may be used with the method of this invention for work at high temperatures to study the solid-like films that form at the interfaces between two immiscible liquid metals. Yet another application of the method of this application is in the study of pharmaceutical substances at an interface between liquid fats or lipins and an aqueous phase. In these systems, the materials under test can be spread at the interface where their surface-active, enzymatic, and similar properties can be emphasized and studied in greater detail.

The embodiments of the invention in which an exclusive property or privilege is claimed are defined as follows:

1. In the recovery of petroleum oil from an underground reservoir by the concomitant injection of surface-modified water into the reservoir through an input well and withdrawal of reservoir fluids from a producing well, the improvement comprising experimentally determining the minimum modification of said water required to substantially prevent the formation of a non-Newtonian film at the interface between said petroleum oil and water by obtaining a plurality of petroleum oil samples from said reservoir, successively placing individual petroleum oil samples in bulk quantities with individual water samples in a vessel to form a plurality of combined samples having horizontal interfaces between the petroleum oil and water phases thereof, said water samples being surface-modified to substantially differing extents, suspending a cylindrical bob in each combined sample at the interface therein, rotating each combined sample in said vessel with respect to said bob at a plurality of substantially differing constant speeds, said differing speeds being applied first in order of increasing magnitude until the highest of said speeds is obtained, and then in order of decreasing magnitude, and measuring the rotative torque applied to said bob at each of said speeds, comparing the torques produced at increasing speeds with the torques produced at decreasing speeds to determine whether the film at the interface between the petroleum oil and the water of each combined sample is substantially Newtonian, selecting that water sample which was least modified but produced a substantially Newtonian film, and injecting into said formation water modified to the same extent as said selected water sample.

2. A method according to claim 1 in which said water sample is modified by the application of heat thereto.

3. A method according to claim 1 in which said water sample is modified by the addition of caustic thereto.

4. A method according to claim 1 in which said water sample is modified by the addition of surfactant thereto.

5. A method according to claim 1 including the step of plotting as a graph the measured values of speed and torque to produce a hysteresis curve characteristic of the film at said interface.

6. A method for determining whether a petroleum oil originated in a selected geological source comprising disposing a sample of said oil of unknown source together with a liquid immiscible with said oil and differing in density therefrom in bulk quantities in a vessel to produce a horizontal interface between said oil and liquid, suspending a cylindrical bob in said oil and liquid at said interface, rotating the liquids in said vessel with respect to said bob at a plurality of substantially differing constant speeds, said differing speeds being applied first in order of increasing magnitude until the highest of said speeds is obtained, and then in order of decreasing magnitude, measuring the rotative torque applied to said bob at various speeds, extracting an oil sample from said geological source, and comparing the torques produced at various speeds by said oil of unknown source and said liquid with the torques produced at the same speeds by said extracted oil sample and an identical liquid.

7. A method according to claim 6 in which said liquid is water.

8. A method according to claim 7 in which said speeds range between 0.1 and 50.0 r.p.m.

9. A method according to claim 6 including the step of plotting as a graph the measured values of speed and torque to produce curves characteristic of the films at the surfaces between each of said oils and said liquids.

References Cited by the Examiner

The Rheology of Surface Coatings, pp. 19, 23, 24, 30 and 31, 1946.

Journal of Scientific Instruments, pp. 70–73, February 1955, volume 32.

Kolloid Zeitschrift, pp. 35–52, April-May 1952, volume 126.

Publication Viscosity and Elasticity of Oil Surfaces and Oil-Water Interfaces, Journal of Applied Physics, pp. 838–842, July 1955, volume 26.

RICHARD C. QUEISSER, *Primary Examiner.*

C. A. CUTTING, ROBERT EVANS, *Examiners.*